Figure 1:
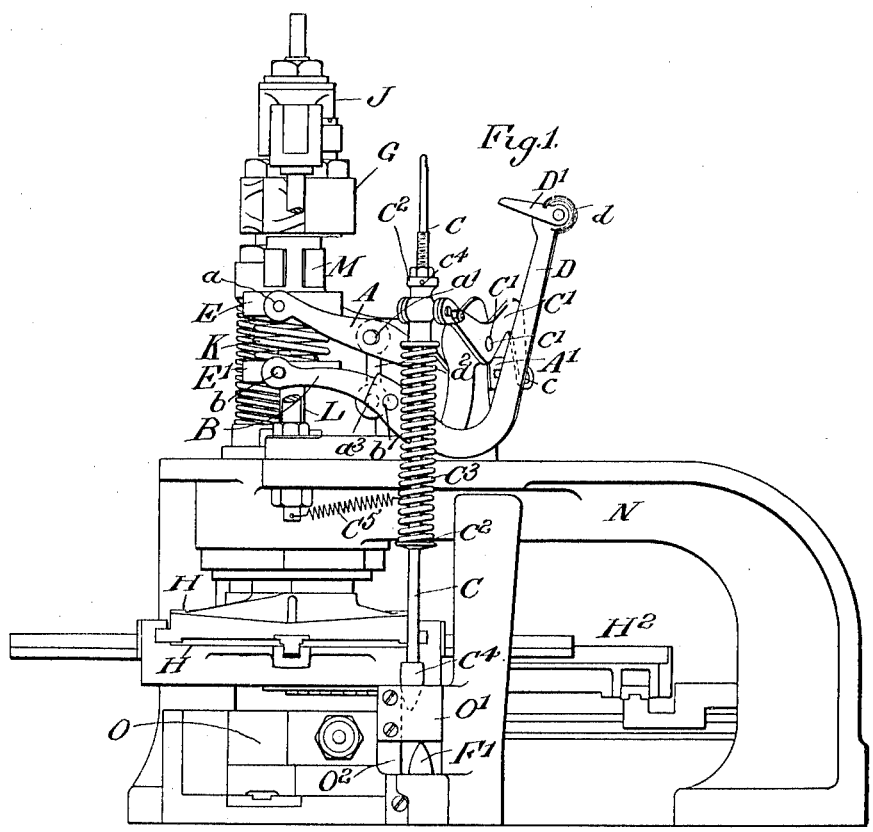

F. H. PIERPONT.
TYPE CASTING MACHINE.
APPLICATION FILED APR. 11, 1911.

1,061,559.

Patented May 13, 1913.

7 SHEETS—SHEET 1.

F. H. PIERPONT.
TYPE CASTING MACHINE.
APPLICATION FILED APR. 11, 1911.

1,061,559.

Patented May 13, 1913.
7 SHEETS—SHEET 2.

Witnesses

INVENTOR
F. H. Pierpont
By Church & Church
his Attorneys

F. H. PIERPONT.
TYPE CASTING MACHINE.
APPLICATION FILED APR. 11, 1911.

1,061,559.

Patented May 13, 1913.
7 SHEETS—SHEET 3.

Witnesses

INVENTOR
F. H. Pierpont
By Church & Church
his Attorneys

F. H. PIERPONT.
TYPE CASTING MACHINE.
APPLICATION FILED APR. 11, 1911.
1,061,559.
Patented May 13, 1913.
7 SHEETS—SHEET 4.
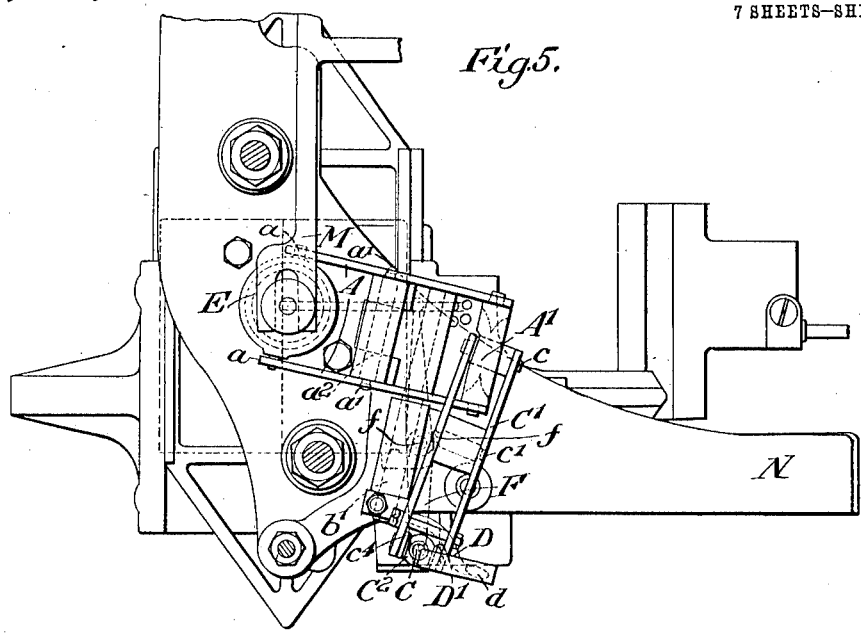
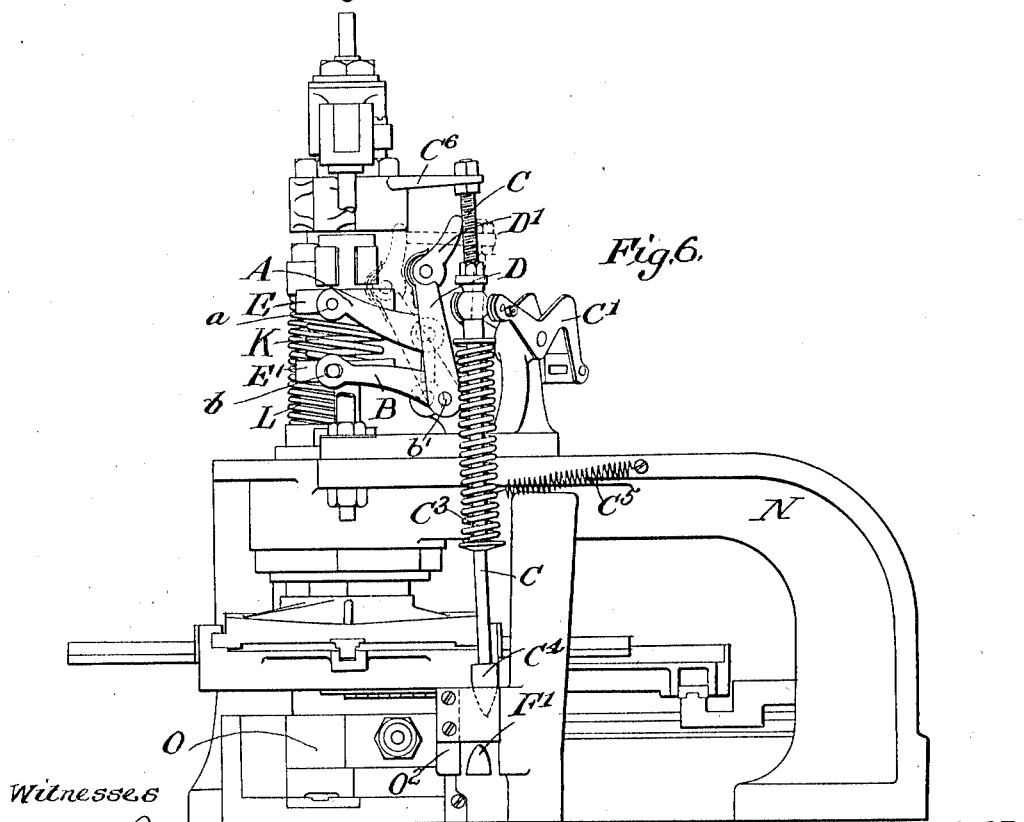
Witnesses
INVENTOR
F. H. Pierpont
By Attorneys

F. H. PIERPONT.
TYPE CASTING MACHINE.
APPLICATION FILED APR. 11, 1911.

1,061,559.

Patented May 13, 1913.
7 SHEETS—SHEET 5.

Witnesses

INVENTOR
F. H. Pierpont
By Church & Church
his Attorneys

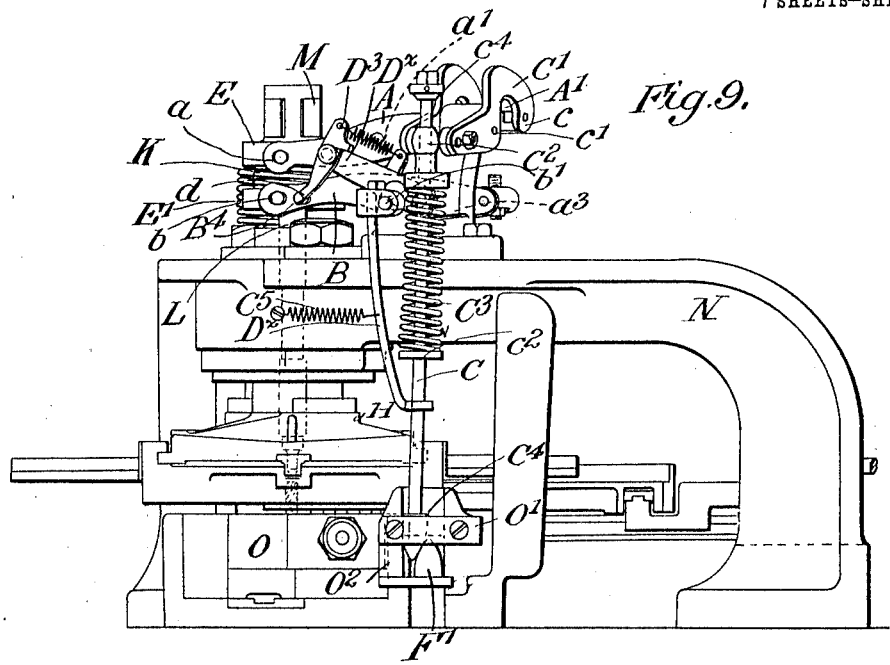
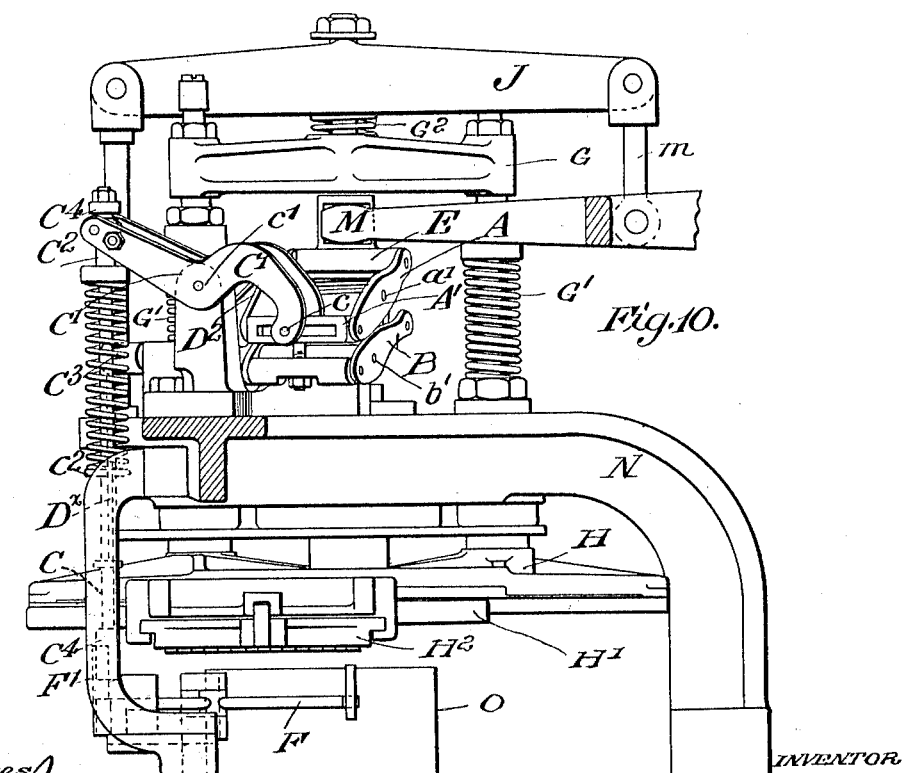

F. H. PIERPONT.
TYPE CASTING MACHINE.
APPLICATION FILED APR. 11, 1911.

1,061,559.

Patented May 13, 1913.
7 SHEETS—SHEET 7.

Witnesses

INVENTOR
F.H. Pierpont
By Church & Church
Attorneys

UNITED STATES PATENT OFFICE.

FRANK HINMAN PIERPONT, OF HORLEY, COUNTY OF SURREY, ENGLAND, ASSIGNOR TO LANSTON MONOTYPE MACHINE COMPANY, OF PHILADELPHIA, PENNSYLVANIA, A CORPORATION OF VIRGINIA.

TYPE-CASTING MACHINE.

1,061,559.      Specification of Letters Patent.      Patented May 13, 1913.

Application filed April 11, 1911. Serial No. 620,390.

*To all whom it may concern:*

Be it known that I, FRANK HINMAN PIERPONT, of Salford, Horley, county of Surrey, England, have invented certain new and useful Improvements in Type-Casting Machines; and I do hereby declare the following to be a full, clear, and exact description of the same, reference being had to the accompanying drawings, forming a part of this specification, and to the figures and letters of reference marked thereon.

This invention relates to type casting machines in which the matrices are individually and removably applied and clamped to the casting mechanism. To enable the machine to produce low quads or spaces, the mold is provided with a divided mold-blade, with two mold-blades, (or with other form of cut-off mechanism for adjusting the mold cavity,) controlled through the matrix clamping mechanism.

The chief object of the present invention is to provide improved mechanism controlled through the matrix clamping mechanism for adjusting the mold, and also to provide mechanism whereby the movement or lift of the clamping mechanism can be varied readily or adjusted in accordance with the requirements of the matrices in use.

According to the present invention, two levers pivoted intermediate of their ends to stationary supports have their power ends connected one to the driving and the other to the driven member of the matrix clamping mechanism, with their weight ends connected one to a member controlling or adjusting the cut-off blade and the other to a designating or selecting member for determining the operative position of or direction of operation of the controlling member. The driving and driven members of the matrix clamping mechanism have as hitherto a spring disposed between them through which the pressure applied to the driving member is transmitted to the driven member, and according to the present invention the upward movement of the driven member is controlled by the weight end of the lever connected to the driving member coming in contact with the weight end of the lever connected to the driven member. To enable the extent of upward movement of the driven member and, therefore, the centering pin, to be varied or adjusted, an adjustable block or screw is interposed between the weight ends of the two levers; or the fulcrum of one of the levers may be adjustable.

Figure 2:
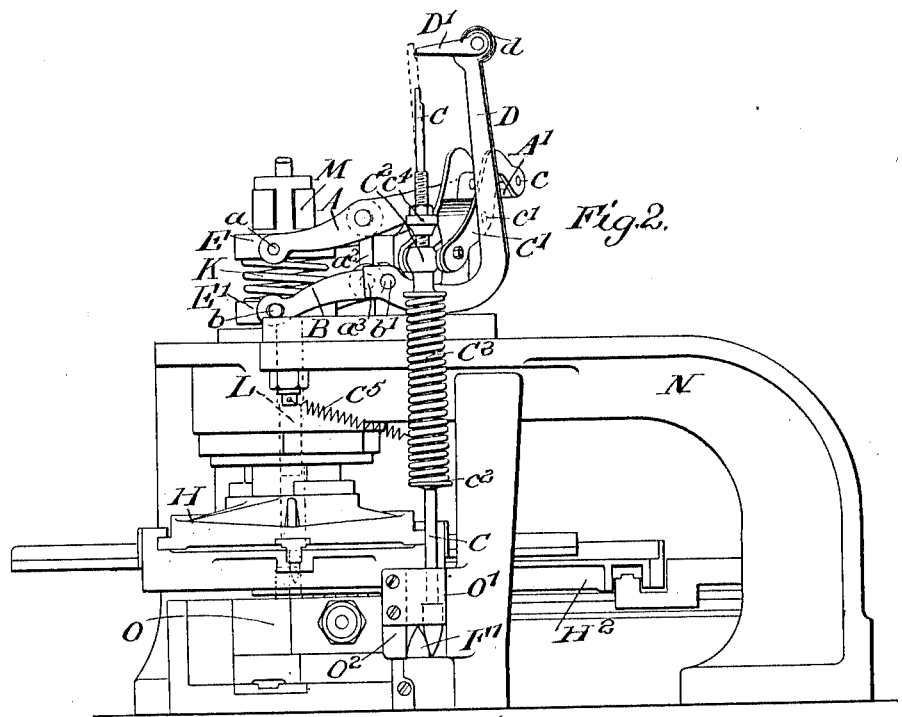
Figure 3:
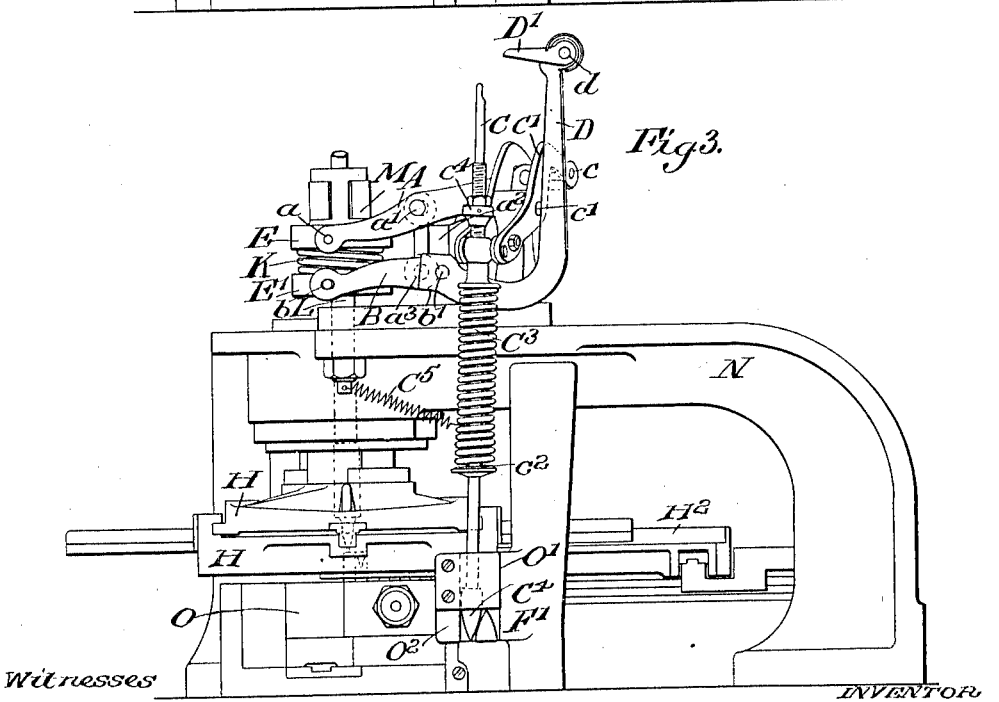
Figure 4:
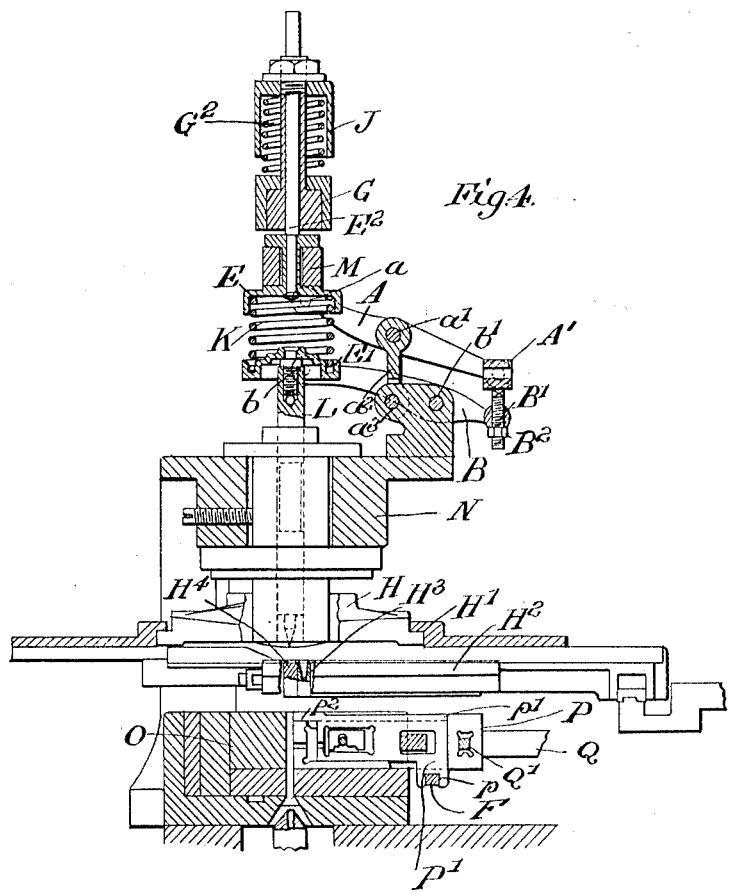
Figure 7:
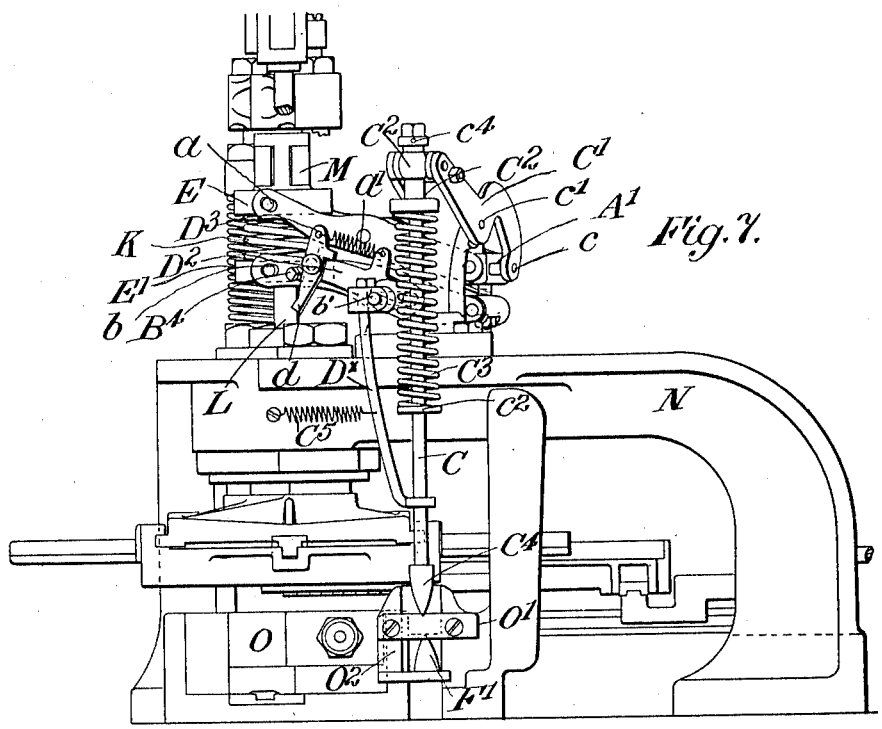
Figure 8:
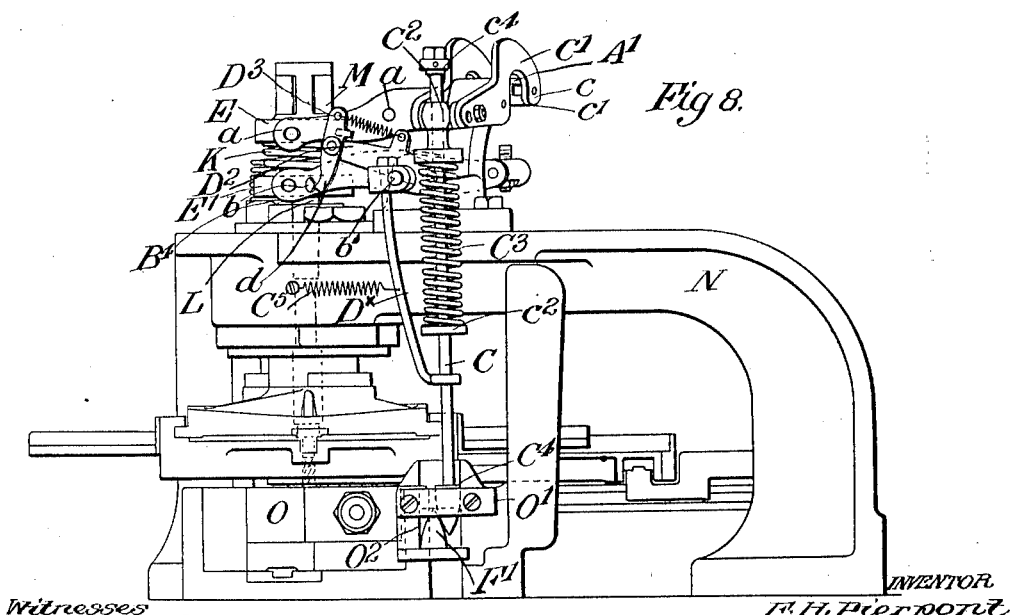
Figure 11:
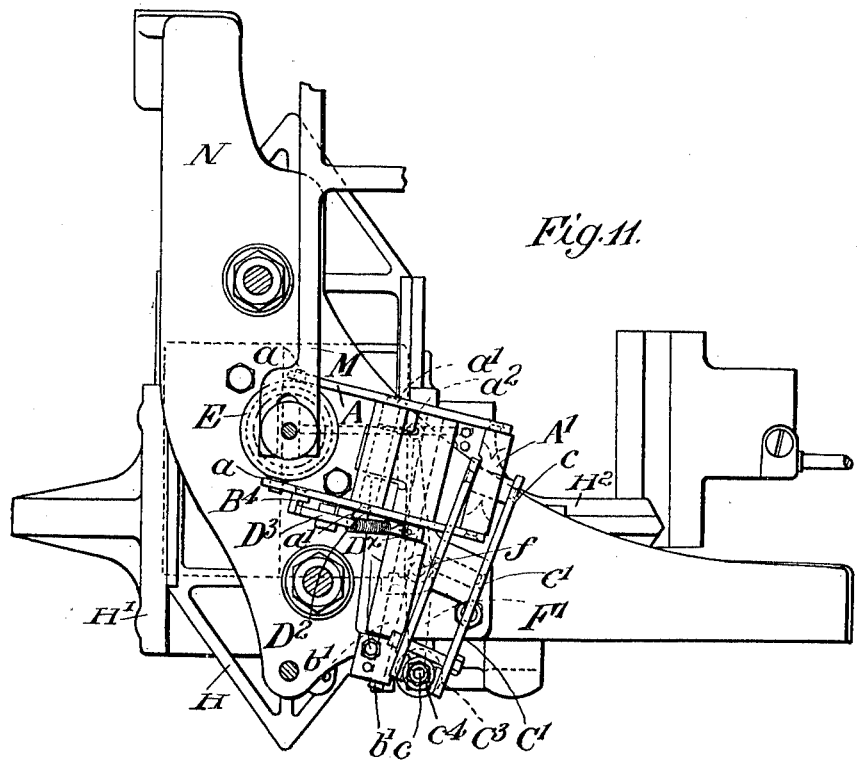

Referring to the accompanying drawings: Figure 1 is an elevation of an embodiment of the present invention applied to a casting machine and mold of known construction and showing the clamping mechanism at the upper extreme of its travel. Fig. 2 is a similar view showing the clamping mechanism at its lower extreme and clamping a normal matrix on the mold, the mold adjusting mechanism being, therefore, in the position it assumes when full height type are to be cast. Fig. 3 is a similar view to Fig. 2, but showing the clamping mechanism engaging a special matrix and the adjusting mechanism in the position assumed when low quads or spaces are to be cast. Fig. 4 is a sectional elevation showing the pivoted levers connected with the driving and driven members of the clamping mechanism. Fig. 5 is a plan of Fig. 1. Fig. 6 is an elevation showing a modified embodiment of the invention. Figs. 7, 8 and 9, are similar views to Figs. 1, 2 and 3, showing a further modification of the invention. Fig. 10 is a side elevation of the mechanism according to Figs. 7 to 9 and part of which is also applicable to Figs. 1 to 4. Fig. 11 is a plan of the mechanism shown in Figs. 7 to 9.

The same reference letters designate like parts in the several figures.

A and B are the levers connected to and operated by the matrix clamping mechanism; C is the controlling member for the mold cut-off; D is the designating or selecting member; E E' are respectively the driving and driven members of the matrix clamping mechanism; and F is a lever coupled with the cut-off blade or section of the mold.

In the particular embodiment herein described, the invention is shown applied to a mold of well-known construction (see Patent No. 925,024 of June 15, 1909) and a clamping mechanism partly of known construction (see Patent No. 625,998, of May 30, 1899); it is, therefore, unnecessary to refer to these already existing parts in detail. It is sufficient for present purposes to state that the clamping mechanism comprises a crosshead G to which is coupled a frame H carrying a supporting frame H' for a die-case H²; a die-case operating lever J; a matrix centering plunger L engaging the matrix to center and clamp it upon the mold; and a main actuating lever M coupled through a link $m$ Fig. 10 with the die-case lever J and engaging the stem E² of the head E to depress the plunger L through interposed spring K.

N is the bridge or frame supporting the die-case, the centering mechanism, and mold adjusting mechanism; O is the mold; P and P' the two mold blades situated side by side in the mold; Q is the slide carrying the cross-pin Q' for withdrawing the main mold blade to dimension the mold and to advance both blades to eject the type after casting.

Cross head G with its connected die-case carrying frame H is supported upon springs G' and a compression spring G² is interposed between said cross head and its operating lever J.

Motions corresponding in direction but differing in extent are transmitted to die case H² and plunger L from lever M, the shorter, hence slower, movement being communicated to the die-case, so that when both are fully retracted a complete separation of the die-case and plunger will be effected, to permit readjustment of the die-case, and when lever M is moved to advance the die-case and plunger the latter, owing to its more rapid motion, will overtake the die-case and engage a contained matrix to center the same before said matrix is finally seated upon the mold.

Referring first of all to the embodiment in Figs. 1 to 5, inclusive, a lever A is pivotally connected at its power end $a$ to the head E which latter is attached to and moves in company with the centering lever M, while a lever B is pivotally connected by its power end $b$ to the head E', the latter connected to and always moving in company with the centering pin L. The lever A is fulcrumed intermediate of its ends at $a'$ to a link $a^2$ which is pivoted to a stationary support on the machine frame at $a^3$ while the lever B is also fulcrumed at $b'$ to a stationary support on the frame N. Secured to the pivot or shaft $b'$ of the lever B is a designating or selecting member in the form of a striker or lever D which is adapted to engage and operate an actuating or controlling member C for the cut-off section of the mold. At its upper end the lever D has pivoted to it a projecting piece or nose D' which is yieldingly supported in one direction by a spring $d$. The levers A and B are duplicated to give strength and stability, and between the weight ends of the duplicate parts of lever A is interposed a longitudinally slotted cross-piece A' through the slot in which is passed a pin $c$ connected to the similar ends of a duplicate lever C' fulcrumed at $c'$ to the machine frame and connected at its weight end through a spherical or other form of universal joint to a boss C² adapted to slide upon the controlling member C. Between the boss C² and a shoulder or ring $c^2$ on the member C is interposed a spring C³, forming a resilient driving connection between the lever C' and the rod C. $c^4$ is an adjustable collar on the boss C² which serves as an abutment for the rod C, to effect the upward movement of the rod C, and by adjusting which the power of the spring can be regulated. When the rod C is in its upper position as shown in Fig. 1, the boss C² is pressed and held against the collar $c^4$ by springs C³. The universal joint between the lever C' and the boss C² on the rod C allows the rod to rock or oscillate. When normal or full height types are being cast, the rod assumes, or is rocked into, one position or in one direction by operation of lever D, and when a special or low quad matrix is presented and, therefore, the normal movement of the clamping mechanism is interfered with or varied the rod C is shifted and maintained in the opposite position by the retaining spring. The operations of the controlling member or rod C as above indicated may be transmitted in various ways to the cut-off section or blade of the mold, and in the present example the rod C acts upon a mechanism comprising a lever F having a heart-shaped cam piece F' fulcrumed at $f$, a cut-off mold-blade P' having an extension with a slot $p$ into which enters one end of the lever F; and a main mold-blade P, the two blades together occupying the space between the side walls of the mold. The cut-off blade P' has a nose or projection $p^2$ which rests upon the upper edge of the main blade P and these two blade are both withdrawn to the same extent to dimension the mold for full height bodies; but when the main blade P is alone withdrawn the top wall of the mold is formed by the projection $p^2$ on the blade P', and the mold cavity shortened by the depth of the projection, to produce a low quad or space. To effect the desired movement of the lever F for changing from full body type to low quads and vice versa there is secured on the lower end of the rod C a cam piece C⁴ conveniently of V or heart-shape and adapted to engage on one or the other side of cam piece F' on the end of lever F the side engaged depending upon the action of the designating or selecting member D. When full height or normal type are being cast, that is to say when matrices H³ having a relatively deep cavity, as shown in Fig. 4, are being used, the lever M in descending compresses spring K between the heads E E' and depresses pin L the point of which by entering the cone hole in the matrix H³ is allowed to descend to its full extent. As by this movement the lever B is turned on its pivot through the descent of the head E', it moves the lever D toward and against the upper end of rod C before the latter has been lowered by the lever A far enough to clear nose D' of lever D (as indicated in broken lines in Fig. 2) and moves said rod against the action of the spring C⁵ until the cam piece C⁴ has engaged the right hand side of the cam piece F' on the lever F as shown by full lines in Fig. 2. The rod C descending now passes between the right hand side of the cam piece F', and a stationary guide O' on the mold body or on the machine frame, thereby effecting the movement of the lever F to retract the cut-off blade P' of the mold to the same extent as the main blade P has been retracted by the slide or lever Q in dimensioning the mold for the casting of a full-height type-body. The two mold-blades are separate and as already stated, are retracted by independent mechanisms; and in order to avoid unnecessary wear between the two blades, such as would arise if the two blades moved backward at different times, the mechanism is so devised that the main section is not moved back by the slide or lever Q prior to the movement of the cut-off section by the rod C and lever F. The rear end $p$ of the cut-off section bears against a shoulder $p'$ on the main section so that it cannot move back in advance of the main section. The lever C' causes the boss C² to descend on the rod C and compress the spring C³ so that when the main mold-blade is retracted by the usual slide or lever Q the spring C³ in expanding forces rod C down, moving lever F to retract the cut-off blade in company with the main blade. On the upward movement of the centering lever M after the casting has been made lever A rises and draws the boss C² upward and lifts the rod C. On the presentation, under the pin L, of a matrix H⁴ having a relatively shallow or no centering cone hole, (see Fig. 4) representing a space or quad, the head E' is unable to descend to its fullest possible extent although the head E will descend its usual distance, depressing the spring K, and the downward movement of head E' being thus arrested, the motion transmitted to the lever B will be insufficient to bring the lever D into contact with the rod C as the latter descends under the action of the levers A and C'. While so descending spring C⁵ will cause the cam piece C⁴ of rod C to pass down between the left hand side of cam piece F' and stationary guide O² The effect of this will be to hold the cut-off section of the mold in its forward position, to shorten the depth of the mold cavity and produce a low quad or space, while the main blade is withdrawn as usual to dimension the mold. If the cut-off section P' should have been moved backward slightly by reason of frictional contact with the main section, before the rod C bears upon the lever F the engagement of the two cam pieces will cause the cut-off section to be returned to its forward position and thereby shorten the mold cavity as stated. The cone pin or plunger L is retracted to allow the die-case to be positioned for the next matrix to be cast by the weight end of lever A contacting with the weight end of lever B. The depth of the centering cavities in the matrices of one die-case differ sometimes from the depth of the cavities of the matrices in another die-case, and, therefore, the necessary lift of the cone pin L differs accordingly; and to enable the same cone pin L to be employed with these different die-cases, by an adjustment of the lift of the pin L, there is mounted on the weight end of the lever B an adjustable stop B' conveniently in the form of a screw having a suitably shaped head and adapted to screw into a corresponding opening in the end of the lever and provided with a lock nut B².

In the above described embodiment of the invention the designating or selecting member D acts upon the rod C to position the latter before the mold is dimensioned for every full height type to be cast, and since, in ordinary composition, there are more full height type, that is characters and the like, than quads or spaces, extra wear due to these movements is likely to be produced. This objection can be overcome readily and a convenient embodiment for accomplishing it is shown in the modification in Fig. 6, wherein lever D is mounted as formerly on the pivot of lever B but is positioned on the opposite side of the rod C to that shown in Figs. 1 to 5 so that it normally stands in the path of a projection C⁶ on the rod C; thus when low quads or spaces are to be cast and the head E' does not descend to the full extent, lever D will not be turned fully on is fulcrum, and, therefore, the projection D' will intercept and contact with the arm C⁶ and the rod C will be moved into the dotted position shown in Fig. 6 against the action of spring C⁵. In this example the spring C⁵ is mounted on the opposite side of the rod C' to that shown in Figs. 1 to 5, thereby holding rod C with its cam piece C⁴ normally to the right of cam piece F' or in the full body position. When a normal or full-height type is to be cast, the lever D, on account of its power end following the movements of the head E', will be withdrawn from the path of the arm C⁶, before the latter reaches the path of projection D' and the rod C as it descends under the influence of the levers C' and A will clear projection D' and engage the right hand side of the cam piece F', thereby moving the cut-off section of the mold-blade back to dimension the mold to the extent determined by the main section of the mold blade, as already described. When, however, the descent of the pin L is obstructed by a quad or space matrix having no centering cavity or a shallow one, the movement of lever D will be so delayed that it will not be withdrawn from the path of the arm $C^6$ before the latter arrives at the point of intersection of the two paths, and the contacting of these two arms will effect the rocking of the rod C so that as the latter continues to descend the lever F will be held in position to retain the cut-off mold-blade in its forward position to shorten the mold. As the time permitted for effecting the adjustments of the mold is limited and must take place between the contacting of the cone pin with the matrix and the final clamping of the die-case and matrix upon the mold, the weight ends of the levers A and C are made longer than the power ends of these levers so as to amplify the motion between the head E and the rod C. The arms of the lever B are also made unequal in order that the movements of the parts controlled by that lever may take place in proper timed relation to the movements of the other co-acting parts.

Referring now to the modified arrangement shown in Figs. 7 to 11, the levers A and B, C' and the rod C remain as in previously described examples, but the designating or selecting member is replaced by a lever $D^x$ mounted on shaft $b'$ upon which the lever B is loosely fulcrumed, and fixed to the shaft $b'$ is an arm $D^2$ of lever $D^x$ which carries on its outer end a spring-controlled projection or trigger-piece $D^3$, the nose $d$ of which stands in the path of a pin $B^4$ on the lever B. The rod C normally hangs in a position to descend on the left hand side of the cam F', being returned always to this position in rising, by a spring $C^5$ connected to the lever $D^x$. When the pin L engages a special matrix, the pin $B^4$ will engage the nose of the trigger $D^3$, but by the time it so engages the rod C will have descended far enough to engage the cam F' and therefore the striker will not be able to move the rod C, and the pin $B^4$ will override the trigger $D^3$, the parts assuming the position shown in Fig. 9. When a normal matrix is positioned under the pin L, the descent of the head E' is not intercepted or retarded and the pin $B^4$ will engage the trigger $D^3$ pulling it and the arm $D^2$ downward thereby rocking the shaft $b'$ and causing the lever D to move the rod C to the right, before lever C' has advanced said rod into engagement with cam F' so that when head $C^4$ descends it will engage the right side of the cam F', as in Fig. 8, and effect the backward movement of the cut-off blade in company with the main blade.

What I claim as new and desire to secure by Letters Patent, is:—

1. In a type casting machine the combination with mechanism for clamping a matrix upon a mold, comprising driving and driven members, of an actuating member connected with the driving member, and a designating or selecting member operated by the interruption of the normal travel of the driven member to determine the direction of movement of the actuating member substantially as described.

2. In a type casting machine the combination with clamping mechanism comprising driving and driven members of two levers pivoted to the machine frame and connected one to the driving and the other to the driven member, an actuator connected to the driving member lever and a designating or selecting member connected to the driven member lever for determining the direction of motion of the actuator substantially as described.

3. In a type casting machine provided with a low quad mold, a matrix carrier, a reciprocatory centering pin and a driving member yieldingly coupled with the latter and in combination therewith actuating means for the cut-off member of the mold coupled with said driving member and adapted to move said cut-off member in opposite directions and a designating or selecting member coupled with the centering pin and acting upon said actuating means to determine its action in projecting or retracting said cut-off section.

4. In a type casting machine provided with a low quad mold containing a movable cut-off section, interchangeable matrices, and a reciprocating centering pin coupled with a driving member and in combination therewith actuating devices for said cut-off section coupled with said driving member and adapted to shift the cut-off section into either of two positions corresponding respectively with full body and short body type, and a selecting member coupled with the centering pin and acting upon said actuating devices to determine the direction of motion of the cut-off section.

5. In a type casting machine provided with a matrix seating member, actuating means therefor including driving and driven members, the latter coupled with said matrix seating member, yielding transmission means intermediate said driving and driven members, and a low quad mold equipped with a plurality of movable dimensioning members for the mold cavity and in combination therewith means for transmitting motion to one of the movable mold dimensioning members from said driving member and for controlling the direction of such motion, the same comprising a reciprocatory member coupled with the driving member and adapted to shift the mold dimensioning member in either of two directions, and a controlling member coupled with the driven member for selectively determining the application of said reciprocatory member and the direction of motion transmitted to the mold member.

6. In a type casting machine provided with matrix clamping mechanism including driving and driven members whereof the driven member is coupled with the matrix clamping mechanism, and a low quad mold provided with a dimensioning member and actuating devices therefor, and in combination therewith a reciprocatory member coupled with the driving member and adapted to shift the mold actuating device in either of two directions, and means coupled with the driven member for controlling said reciprocatory member and the direction of the motion transmitted by the latter to the dimensioning member of the mold.

7. In a type casting machine the combination with a clamping mechanism including driving and driven members, a clamping member coupled with said driven member and a yielding transmitting means intermediate said driving and driven members, of a lever mounted upon a stationary support, connected to move in unison with the driving member and coupled with the driven member in a manner to positively retract the latter.

8. In a type casting machine the combination of the following elements, to wit; a matrix clamping mechanism including driving and driven members, an interposed yielding transmission member, and a clamping member coupled with the driven member; a lever mounted upon a stationary support and coupled with the aforesaid driving member; and a second lever also fulcrumed on a stationary support coupled with the aforesaid driven member and acting upon the first named lever to positively move the driven member in a direction opposed to its yielding transmission member.

9. In a type casting machine provided with a clamping mechanism comprising driving and driven members, an interposed transmitting spring, and clamping means coupled with the driven member, and in combination therewith retracting devices for said clamping member including a lever pivotally supported on the frame and connected to the driving member, a second lever also pivotally supported on the frame and connected to the driven member, said levers being arranged for engagement in one direction and means for varying the degree of movement imparted by the driving to the driven member through said levers.

10. In a type casting machine provided with a clamping mechanism comprising driving and driven members, a clamping member coupled with the driven member and a spring intermediate said driving and driven members for transmitting motion to the driven member, and in combination therewith, a lever pivotally supported on the frame with one end connected to the driving member, a second lever also pivotally supported on the frame with one end connected to the driven member, the opposite ends of said levers being opposed, and an adjustable member supported on one of said levers in position to engage the other lever during the return movement of the driving member.

11. In a type casting machine provided with a clamping mechanism including driving and driven members, a yielding transmission between said members, and a clamping member coupled with the driven member and reciprocated thereby, and in combination therewith, an actuating member coupled to reciprocate in unison with the driving member and operate in either of a plurality of paths, and means coupled with the driven member and acting upon said actuating member to direct it in either path.

12. In a type casting machine, the combination of the following elements, to wit: a low quad mold provided with actuating devices for its cut-off member; a matrix clamping mechanism including driving and driven members, an interposed yielding transmission and a clamping member coupled with the driven member; and an actuating and control mechanism for said mold actuating devices, the same comprising a reciprocating member coupled to operate in unison with the driving member of the matrix clamping mechanism and movable laterally to engage the mold actuating devices for either advancing or retracting the latter, and means coupled with the driven member of the matrix clamping mechanism for controlling the position of said reciprocatory member and the direction of the motion transmitted thereby to the cut-off member of the mold.

13. In a type casting machine provided with matrix clamping mechanism including driving and driven members, an interposed transmission spring and a clamping member coupled with the driven member and a low quad mold provided with an actuating lever for its cut-off member, and in combination therewith, the following elements to wit: a lever coupled with the driving member; a rod pivotally connected to said lever and movable laterally to alternately engage on opposite sides of the cut-off actuating lever; and a lever coupled with the driven member and movable laterally of said rod to deflect the latter.

14. In a type casting machine provided with matrix clamping mechanism including driving and driven members, an interposed transmission spring, and a matrix clamping member coupled with the driven member, and in combination therewith, a mold cut-off actuating mechanism, comprising a lever connected with the driving member, a sleeve pivotally connected to said lever, a rod extending through said sleeve and provided on one side thereof with an engaging collar, a spring interposed between the other side of the sleeve and said rod, and a lever coupled with the driven member and provided with a striker for shifting said rod.

FRANK HINMAN PIERPONT.

Witnesses:
H. D. JAMESON,
C. P. LIDDON.

Copies of this patent may be obtained for five cents each, by addressing the "Commissioner of Patents, Washington, D. C."